United States Patent [19]
Merkin et al.

[11] Patent Number: 5,634,137
[45] Date of Patent: May 27, 1997

[54] METHOD AND APPARATUS FOR UPDATING SYSTEM CONFIGURATION BASED ON OPEN/CLOSED STATE OF COMPUTER HOUSING COVER

[75] Inventors: Cynthia M. Merkin; Stanley L. Merkin, both of Georgetown, Tex.

[73] Assignee: International Business Machines Corporation, Armonk, N.Y.

[21] Appl. No.: 373,700

[22] Filed: Jan. 17, 1995

[51] Int. Cl.⁶ .................................................. G06F 13/00
[52] U.S. Cl. ............................................ 395/830; 395/284
[58] Field of Search ................................. 395/828–830, 395/284; 361/683; 200/50 A

[56] References Cited

U.S. PATENT DOCUMENTS

| | | | |
|---|---|---|---|
| 4,403,303 | 9/1983 | Howes et al. | 395/500 |
| 5,038,320 | 8/1991 | Heath et al. | 395/830 |
| 5,138,706 | 8/1992 | Melo et al. | 395/500 |
| 5,237,690 | 8/1993 | Bealkowski et al. | 395/700 |
| 5,303,171 | 4/1994 | Belt et al. | 364/707 |

*Primary Examiner*—Jack B. Harvey
*Assistant Examiner*—Sumati Lefkowitz
*Attorney, Agent, or Firm*—Lowe, Price, LeBlanc and Becker; Anthony N. Magistrale

[57] ABSTRACT

In a data processing system of a type including a basic input/output system (BIOS) circuit for carrying out prescribed functions including a power-on self-test (POST) which not only enables the system memory but checks the system configuration based on device register values, the device register values are stored in a non-volatile memory. A novel POST routine responds not only to change of system configuration determined by comparing device register values with values previously stored in the non-volatile memory, but also any change of state of a cabinet switch indicating that a cover of the cabinet housing the PC has been opened. If there has been a change of system configuration and the cover has not been opened since the last boot, the POST routine signals a device error. However, if the cover has been opened, the change of configuration is presumed intentional, i.e., the user has added or removed one or more devices, and the POST routine revises device register values stored in the non-volatile memory accordingly.

9 Claims, 5 Drawing Sheets

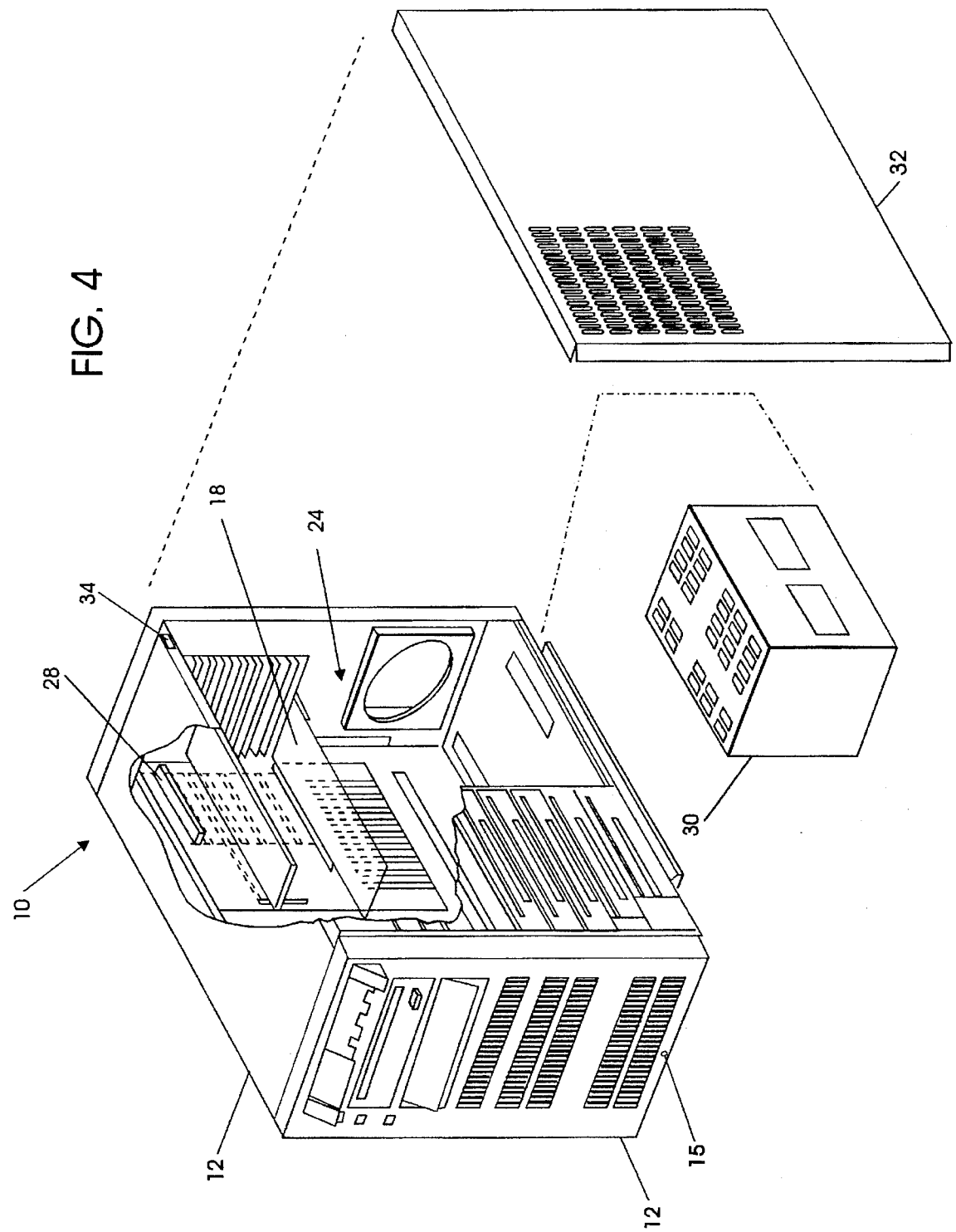

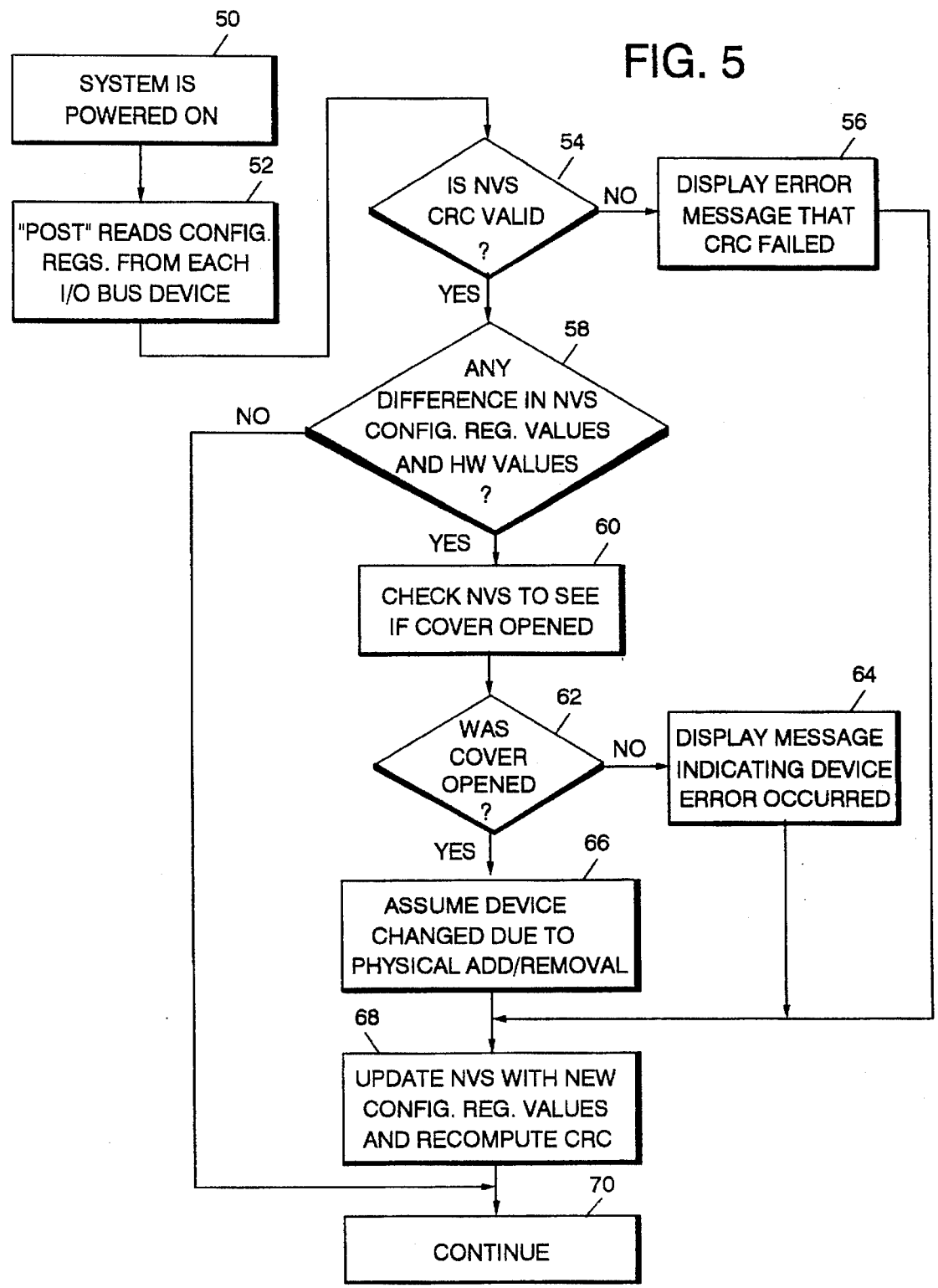

METHOD AND APPARATUS FOR UPDATING SYSTEM CONFIGURATION BASED ON OPEN/CLOSED STATE OF COMPUTER HOUSING COVER

BACKGROUND OF THE INVENTION

1. Field of the Invention

This invention relates generally to data processing systems, and more particularly, to the power-on self test routine (POST) executed upon start up of a data processing system such as a personal computer (PC).

2. Description of Related Art

All computers, such as the various models of personal computers, or PC's, produced by IBM, execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the operating system. Booting occurs automatically when the PC is first turned on, a process called a "cold boot," or by the user while the computer is running ("warm boot").

Bootstrapping performs only two functions, the first being to run a power-on self-test, or POST, routine and the other to search the storage media (floppy diskette or hard disk) for the operating system it will load. These functions are controlled by firmware stored in one or more basic input-output system, or BIOS, chips inside the PC.

The IBM PC operating environment is depicted in FIG. 2, a map of the first 1 M of random access system memory. Within the first 640 K byte region of the system memory is stored base BIOS data, such as interrupt vectors and other machine specific operating parameters such as identification of drives and access to them through BIOS INT 13 functions. This is followed in the same region of memory by the operating system, such as DOS, followed by any application programs. Residing in the upper layers of the system memory, above 640 K (called "upper memory") but beneath the 1 Mbyte boundary, are video data and firmware based BIOS which is fixed for all applications.

The POST, residing in the upper 128 K of memory (BIOS) as shown in the FIG. 2 memory map, initializes all the internal hardware and external hardware connected to the PC, such as memory, drives, adapter boards, etc., and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The conventional POST routine, having executed early in the boot process, issues a report indicating whether all the devices making up the system configuration are installed, that is, confirms that the system configuration has not changed, and indicating whether the devices are operational. These functions are performed by reading the values of device configuration registers associated with the devices, and comparing those values with prestored values.

If a value associated with a particular device is not able to be read during POST, that device is presumed to have catastrophically failed, for example, by having become unseated from its electrical connection to the bus, or having become open-circuited or otherwise non-functional.

However, the detected device values may not match with the prestored values, not because there is a device failure in the system, but because the system configuration was intentionally changed by the user since the operating system was last booted. In such an event, the POST will check the device inventory with reference to an obsolete configuration.

SUMMARY OF THE INVENTION

An advantage of the invention is in overcoming at least the foregoing disadvantages in conjunction with the conventional POST routine. A further advantage derives from providing a novel POST routine that not only tests the system configuration, but also redefines the configuration, automatically, when any detected irregularity is as a result of an intentional change of hardware. Another advantage of the invention derives from detecting an intentional change of hardware by monitoring the state of a cover switch, detecting PC cover removal as a result of switch state change, and integrating this information into the POST routine.

The invention provides a data processing system comprising a central processing unit (CPU), a system memory for storing data in the form of electrical signals, ports for receiving and supplying electrical signals from and to devices, and a bus for interconnecting system components. The CPU is of a type including a BIOS circuit for carrying out prescribed functions including a power-on self-test (POST) routine which verifies that the system configuration has not changed since the last boot, and tests system devices, based on information stored in device registers. In accordance with an important aspect of the invention, device register values are stored in a non-volatile memory connected to the bus. The POST routine responds to a change of system configuration, together with an indication that access to the devices has been made by the user. If the cover has been opened, and system configuration changed, the POST routine presumes that the configuration was changed intentionally by device addition or removal, and device values stored in the non-volatile memory are revised correspondingly.

Preferably, access to the devices is detected by detecting a change of state of a cabinet switch when a cover of the cabinet housing the PC has been opened, enabling access to the devices, since the operating system was last booted.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 is a perspective view of a PC cabinet, in exploded form, exposing the cover switch shown symbolically in FIG. 4.

FIG. 5 is a flow chart showing the modified POST routine of the invention.

DESCRIPTION OF THE ILLUSTRATIVE EMBODIMENT(S)

Figure 1:
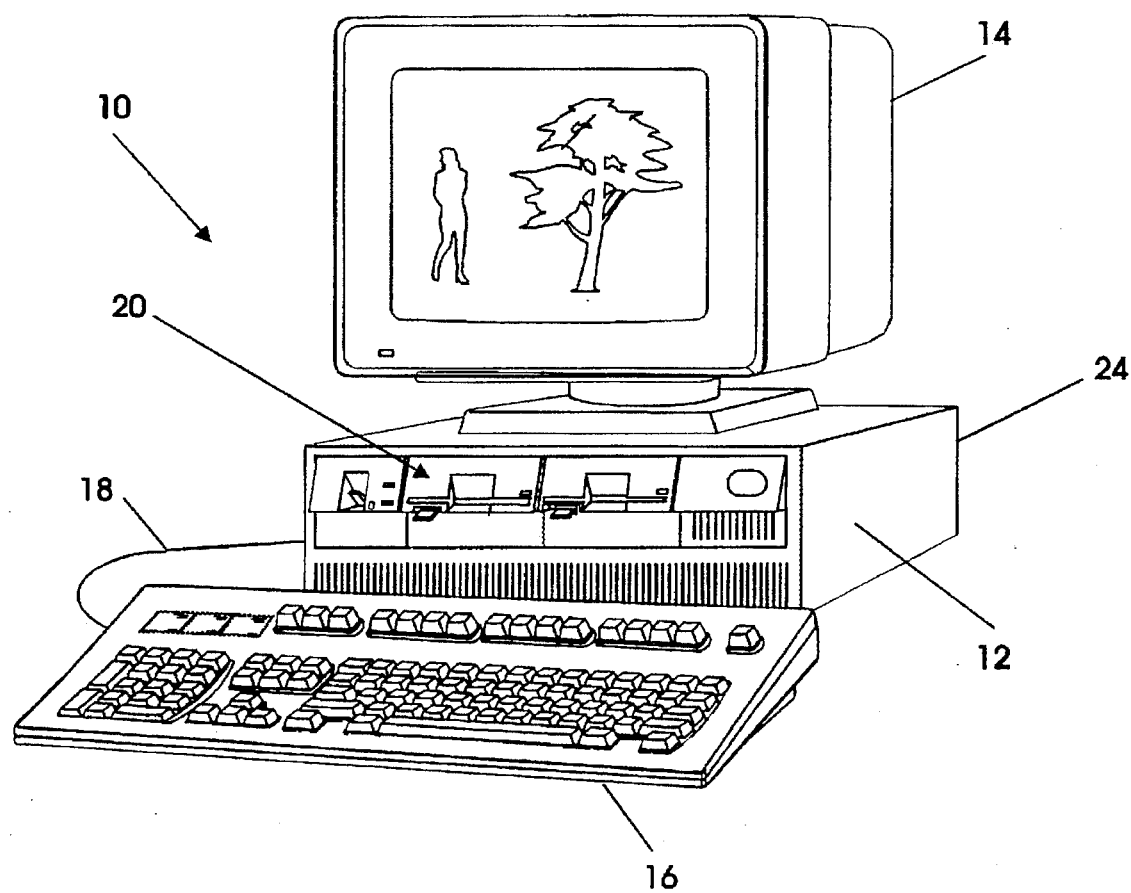
FIG. 1 is a perspective view of a personal computer system within which the present invention has application.
Figure 2:
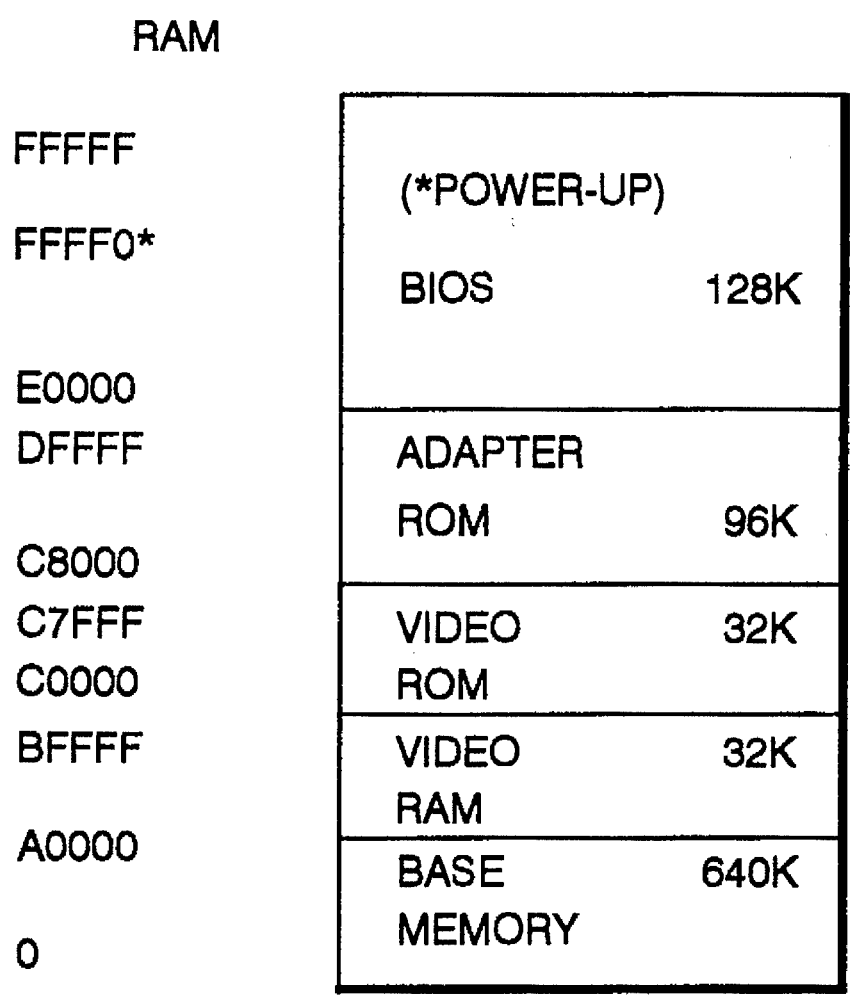
FIG. 2 is a map of the first 1 M of random access main memory, encompassing the modified POST routine, in accordance with the invention.

With reference now to the Figures, and in particular with reference to FIG. 1, a personal computer, or PC, designated 10 is of the environment to which the invention has particular utility. The computer 10 which preferably, but not necessarily, is of a type utilizing an IBM Personal Computer or similar system, includes a console housing 12 within which circuit boards containing the necessary circuitry including microprocessor and BIOS chips, controllers, random access memory and other hardware are arranged. The computer will also include a video display 14 and a keyboard 16 connected into the housing 12 through cable 18. Mass storage media 20 include a hard drive within the housing and not accessible to the user, and user accessible floppy disk as well as, optionally, CD-ROM drives. The computer housing 12 includes at least one access opening, such as opening 26 in FIG. 4, for enabling access to adapters and devices, such as circuit boards 28, removable storage media (not shown), power supply 30, etc., hereinafter referred to simply as "devices," operating within the computer. The opening 26 is enclosed by a cover 32; the cover is normally removed only for servicing such as adding or removing a circuit card or other device carrier.

Figure 3:
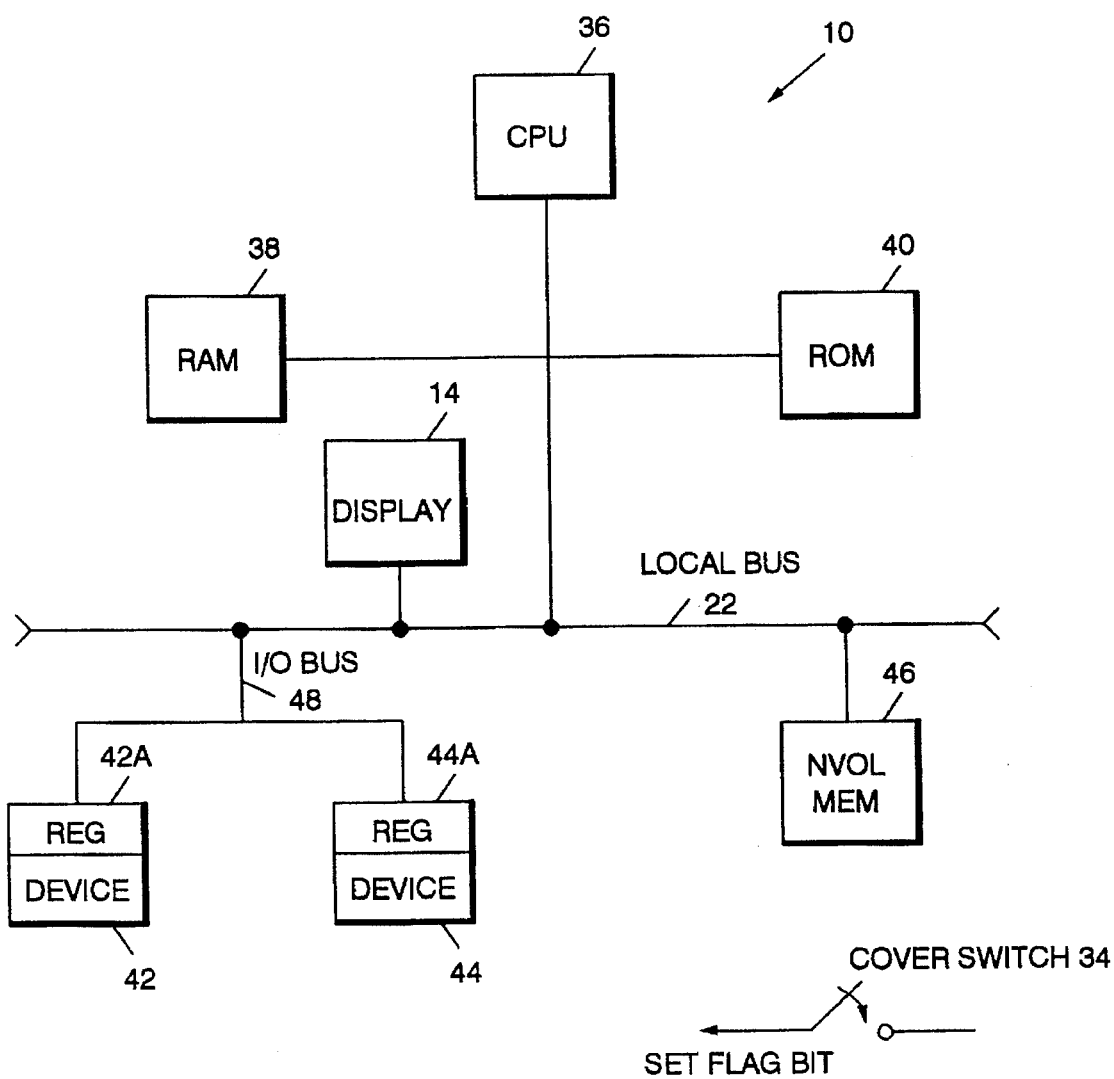
FIG. 3 is a block diagram of a personal computer based data processing system including an electrical switch for signalling a cover removal to POST.

The computer system 10, depicted in block diagram form in FIG. 3 in accordance with the best mode, is based on a local bus architecture having a local bus 22 on which data is passed between components of the computer, including a central processing unit (CPU) 36, together with random access memory (RAM) 38 as working memory for storing data temporarily, and read only memory (ROM) 40 for storing permanent data, such as the BIOS code. Data are also stored in the floppy, CD-ROM and hard disk drives 20 for access by the CPU 36 through corresponding controllers (not shown) and bus. Display 14 is connected to the local bus 22 through a video controller (not shown). The keyboard 16 and other internal devices are similarly connected to the CPU 36. Although a local bus architecture is presented herein by way of example, a single bus architecture is possible as well.

Also connected to local bus 22, by way of I/O bus 48 as well as the local bus 22, are exemplary devices 42 and 44. These devices 42, 44, together with other hardware incorporated within the computer system, such as memory, display, keyboard, etc., constitute a "system configuration," which is checked during execution of the POST routine upon booting of the operating system. The devices 42 and 44 report their presence and operating characteristics to the CPU 36 based upon device values stored in registers 42a and 44a, respectively. That is, during execution of the POST routine, the CPU reads the contents of registers 42a and 44a, and drivers within the BIOS, as well as any additionally loaded software drivers, develop electrical signals to operate the devices appropriately.

As in conventional POST, if the CPU 36 determines that one or more devices, such as 42, 44, are missing or not functioning, a message will be displayed on unit 14, indicating that a device error has occurred. However, the CPU 36 is not able to distinguish between an intentional removal or disablement of a device and a device failure. In addition, the IBM POST currently executes a routine which verifies that the system hardware configuration has not been changed by the user. The present invention is based, in part, on the realization that the stored system hardware configuration needs to be updated when access to hardware, to replace or remove a card, is gained.

Hence, in accordance with the invention, and with reference to FIG. 3, a non-volatile memory 46, which may be a non-volatile register or other non-volatile memory unit of a conventional type, is connected to the local bus 22. An electrical switch 34, which may be of any appropriate type, electrical, mechanical, optical, etc., is located on PC housing 12, adjacent cover 32, so as to respond to cover opening or removal. The switch 34 may respond to opening of the cover either by electrically opening or closing, but in either case will set a flag bit in non-volatile memory 46 or notify the CPU 36 in another appropriate manner, reporting that the cover 32 has been opened.

The flag bit, now stored in non-volatile memory 46 and indicating cover removal, signals the necessity of the CPU to redefine the system configuration. It is the redefined system configuration that will be used upon execution of subsequent POST routines.

Referring to FIG. 5, the POST routine, modified in accordance with the invention, is shown in functional form in more detail. In step 50, upon powering on of the computer, that is, a cold boot, the boot sequence begins with execution of POST, which reads the device configuration registers 42a, 44a from each device 42, 44 on the I/O bus 48 (step 52).

In step 54, current device register values, stored in non-volatile memory 46 representing the current system configuration, are tested, using conventional cyclical redundancy check (CRC) software, and any error message resulting therefrom is displayed (step 56). Assuming, however, that no error is detected in step 54, the values read from device registers 42a, 44a are compared with register values previously stored in non-volatile memory 46. If there is any difference between the hardware values and those values stored in non-volatile memory 46, for example, a device has been added or removed, an indication is made (step 58). If not, the POST routine bypasses steps 60–68, and boot continues in a normal manner (step 70).

The routine next checks the content of the non-volatile memory 46 to determine whether the cover switch flat bit has been set as a result of the cover 32 having been opened (step 60). If step 62 indicates that the cover has not been opened, the change in system configuration is presumed not to have been intentional, and hence having resulted from a device failure. A device error flag is produced (step 62) and error message displayed (step 64). If, however, the cover has been opened since the previous boot, determined in step 62, it can be assumed that the device change occurred as a result of intentional addition or removal of a device (step 66).

If either (1) device configuration change was intentional (step 66), (2) a device error was reported (step 64) or a CRC error has occurred (step 56), the configuration register values in non-volatile memory 46 are updated with the new values, and CRC is recomputed (step 68). The boot process now continues to execute POST and the other boot routines in the normal manner (step 70). The next time the system is booted, the same sequence takes place using the updated values.

Accordingly, the invention provides an ability to distinguish between intentional changes in system configuration and device error, by storing device configuration register values in a non-volatile memory. Upon a configuration change, the stored configuration values are updated if the configuration change is detected to have been intentional; otherwise, a device error is deemed to have occurred.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

What is claimed is:

1. A data processing system, comprising:
   a central processing unit (CPU), system memory and bus arrangement for processing data in accordance with program execution therewith;
   a plurality of devices interfaced to said CPU via said bus;
   a non volatile memory storing device values;
   a housing for said system, the housing including at least one openable or removable cover for enabling access to said devices;
   at least one electrical switch indicating open or closed states of said at least one cover;
   a program, executable by said CPU and responsive to a state of said at least one electrical switch, for checking said devices, said program including a power-on self-test (POST) routine executing upon a boot call; and
   said POST routine including a sequence that determines whether system configuration has been changed since the previous boot by comparing device values currently read from said plurality of devices with corresponding values stored in said non-volatile memory;
   said POST routine responsive to the state of said at least one switch wherein if said comparison indicates a change in system configuration and said switch indicates that said cover has been removed, said POST routine assumes that said change in system configuration was intentional, and further wherein if said comparison indicates a change in system configuration and said switch indicates that said cover has not been removed, said POST routine assumes said change in system configuration was unintentional and displays a device error message.

2. The data processing system of claim 1, wherein said POST routine further includes a sequence that detects the state of said at least one cover switch, and, in response to changes in system configuration and switch state indicating that the cover has been removed since the POST routine was last executed, modifying the device values stored in said non-volatile memory.

3. A data processing system, comprising:
   a central processing unit (CPU);
   a system memory for storing data in the form of electrical signals;
   input and output ports for receiving and supplying electrical signals from and to devices associated with said system;
   a non-volatile memory;
   a system bus interconnecting the CPU, system memory, non-volatile memory, input and output ports, and devices; and
   a housing for said system, the housing including at least one cover for enabling access to said devices and at least one switch having a state that is responsive to open or closed orientation of said at least one cover;
   the CPU having a basic input/output system (BIOS) including a power-on self-test (POST) routine for checking said devices based on device values stored in said non-volatile memory, detecting the state of said at least one cover switch, and, in response to changes in device configuration and switch state indicating that the cover has been removed since the POST routine was last executed, modifying the stored device values to reflect the changes in device configuration.

4. The data processing system of claim 3, including a local bus to which at least said CPU and non-volatile memory are connected, and an I/O bus, in circuit with said local bus, to which said devices are connected.

5. A method of self-testing a system configuration in a data processing system comprising a central processing unit (CPU), memory and at least one device operated by the CPU, a housing for the system, and at least one housing cover openable for accessing said at least one device, the method comprising the steps of:
   reading current configuration register values associated with said at least one device;
   comparing said current configuration register values with corresponding configuration register values prestored in a non-volatile memory;
   detecting whether said system has been reconfigured;
   detecting whether said cover has been opened, wherein if said system has been reconfigured and said cover has been opened, it is presumed that said system reconfiguration was intentional, and further wherein if said system has been reconfigured and said cover has not been opened, it is presumed that said system reconfiguration was unintentional and a device error message is displayed;

updating configuration register values in said non-volatile memory with said current configuration register values.

6. The method of claim 5, wherein the detecting step is carried out by monitoring the state of a sensor for detecting position of said cover.

7. The method of claim 6, wherein the sensor comprises a switch, and said detecting step monitors an open or closed state of said switch.

8. The method of claim 6, including storing an indication of the state of said sensor in said non-volatile memory.

9. The method of claim 5, including recomputing cyclic redundancy check values based on said updated configuration register values.

* * * * *